United States Patent [19]

Nippert

[11] 4,071,947
[45] Feb. 7, 1978

[54] BIMETAL RESISTANCE WELDING ELECTRODE AND METHOD FOR MAKING

[75] Inventor: Russell A. Nippert, Delaware, Ohio

[73] Assignee: The Nippert Company, Delaware, Ohio

[21] Appl. No.: 749,983

[22] Filed: Dec. 13, 1976

[51] Int. Cl.² .................. B21C 23/20; B23K 35/40; B23K 35/22

[52] U.S. Cl. ........................ 29/624; 72/258; 72/267; 228/155; 219/119

[58] Field of Search ............... 72/258, 267; 228/155, 228/156; 219/119; 29/611, 624

[56] References Cited

U.S. PATENT DOCUMENTS

| | | | |
|---|---|---|---|
| 2,986,273 | 5/1961 | Bardgett | 228/155 |
| 3,197,843 | 8/1965 | Nippert | 228/155 |
| 3,197,857 | 8/1965 | Nippert | 228/155 |
| 3,634,934 | 1/1972 | Fitzgerald | 228/155 |
| 3,803,892 | 4/1974 | Yamaguchi et al. | 72/258 |
| 3,969,156 | 7/1976 | Wallbaum | 72/258 |
| 4,045,644 | 8/1977 | Shafer et al. | 29/624 |

*Primary Examiner*—Lowell A. Larson
*Assistant Examiner*—Daniel C. Crane
*Attorney, Agent, or Firm*—Biebel, French & Nauman

[57] ABSTRACT

A bimetal resistive welding electrode having a dispersion strengthened copper tip portion and a shank portion formed of a high conductivity copper is produced by brazing together a conductive copper billet and a dispersion strengthened copper billet to form an extrusion blank. The brazing temperature is such that the dispersion strengthened copper is not annealed. The extrusion blank is then extruded into the shape of a welding electrode with the extruding process hardening the conductive copper shank portion to produce a full hard electrode.

5 Claims, 10 Drawing Figures

BIMETAL RESISTANCE WELDING ELECTRODE AND METHOD FOR MAKING

BACKGROUND OF THE INVENTION

The present invention relates to resistance welding and, more particularly, to an improved electrode for use in a resistance welding device.

Resistance welding has long been used as a quick and effective method of joining metal members. The workpieces to be welded are placed in an abutting relationship and a large current is caused to flow across the boundary between the members by a pair of opposed electrodes. The current causes the surfaces of the workpieces to be heated sufficiently to cause the formation of a weld nugget. Typically, the electrodes apply significant pressure to the workpiece during welding. This facilitates the welding process by urging the material together and, also, reducing electrical resistance between the electrode tip and the workpiece material.

Since the welding is accomplished by resistance heating of the material being welded, it will be appreciated that the electrodes will also be heated substantially. It is important to have an electrode of high electrical conductivity in order to minimize the power loss in the electrode and the resulting heating of the electrode. It is also important to have an electrode which is capable of withstanding significant distorting force at the elevated temperatures which result from the welding process. Hollow electrodes have long been used for resistance welding with cooling fluid supplied to the interior cavity in order to reduce substantially the temperature of the electrode shank. It will be appreciated, however, that this method of cooling has certain limitations and, further, that the electrode tip cannot be cooled effectively in this manner.

Electrodes have, in the past, been formed of high conductivity copper in order to minimize the power loss in the electrodes. Such electrode material has a relatively limited life, however, which is due in large part to deformation of the electrode tip after repeated welding operations at high temperature and pressure. It has been the usual practice to reshape or redress the electrode tips to the desired shape. This can be accomplished only a limited number of times, however, and eventually the electrode must be discarded. Not only is it expensive to discard such electrodes, but the down time of the welding machine for replacement of redressed electrodes may be even more expensive.

In order to minimize the cost of scrapping copper electrodes, two piece electrodes having a replaceable electrode tip and a reusable shank have been used. U.S. Pat. No. 2,440,463, issued Apr. 27, 1948, to Cornwall, U.S. Pat. No. 2,780,718, issued Feb. 5, 1957, to Mullen, U.S. Pat. No. 2,829,239, issued Apr. 1, 1958, to Boretti, and U.S. Pat. No. 2,402,646, issued June 25, 1946, to Leathers, all show replaceable electrode tips which are frictionally engaged by a shank portion of the electrode. U.S. Pat. No. 2,437,740, issued Mar. 16, 1948, to Haynes, and U.S. Pat. No. 2,472,173, issued June 7, 1949, to Powell, show mechanical brackets or set screw arrangements for holding the replaceable welding electrode tip.

Such a replaceable tip may also be attached to the shank portion by threading engagement as shown in U.S. Pat. No. 2,761,973, issued Sept. 4, 1956, to Kerr, U.S. Pat. No. 2,796,514, issued June 18, 1957, to Wood, and U.S. Pat. No. 3,310,087, issued Oct. 29, 1963, to Larkworthy. Both U.S. Pat. No. 2,257,566, issued Sept. 30, 1941, to Lewis and U.S. Pat. No. 2,411,859, issued Dec. 3, 1946, to Harwood, show welding electrode tips or tip portions which are mechanically interlocked with a shank portion. In the Harwood device, a reinforcing cap of hardened metal surrounds but does not cover the electrode tip. In the electrode of Lewis, a replaceable tip is pressed into interlocking engagement with the shank portion.

In U.S. Pat. No. 3,446,932, issued Aug. 10, 1948, to Johnson, a replaceable tip for a spot welding electrode is disclosed which is formed from a hardened material, e.g., a drawn copper slug. The tip is then bonded to the electrode body by fusable material, such solder, which has a fusion point lower than the annealing temperature of the tip. U.S. Pat. No. 2,138,388, issued Nov. 29, 1938, to Platz, discloses a replaceable electrode tip which is welded to the shank. U.S. Pat. No. 2,795,688, issued June 11, 1957, to McCaffrey, discloses a welding electrode having a stainless steel alloy tip which is brazed onto a shank made of copper.

U.S. Pat. No. 3,909,581, issued Sept. 30, 1975, to Stone et al., discloses a composite resistance welding electrode having a holder made of an inexpensive, relatively soft metal with high electrical and thermal conductivity and a tip which has additional strength at resistance welding temperatures. The tip may be formed of a more costly material, such as various copper alloys. The tip may be connected to the shank portion with a pressure fit or, alternatively, by brazing. A pressure fit will generally be unacceptable due to the high electrical resistance at the joint. If the tip is brazed onto the shank, however, the shank may be somewhat annealed and weakened. Thus, the improved number of welding operations which could be expected from such an electrode are reduced.

One material which has recently been developed and which has shown high promise for use in resistance welding electrodes is a dispersion strengthened copper which is formed by internal oxidation of a dilute copper-aluminum alloy. This material is extremely hard at welding temperatures and highly conductive. U.S. Pat. No. 3,779,714, issued Dec. 18, 1973, to Nadkarni et al., U.S. Pat. No. 3,884,676, issued May 20, 1975, to Nadkarni et al., and U.S. Pat. No. 3,893,841, issued July 8, 1975, to Nadkarni et al. disclose dispersion strengthened metals of the type intended to be used with the present invention. As discussed in the August 1976 edition of METALS ENGINEERING QUARTERLY, pages 10-15, in an article by Nadkarni et al., this dispersion strengthened copper alloy material produces superior welding electrodes. The disadvantage of such an electrode, however, is the relatively high cost; this dispersion strengthened copper alloy material is more than twice as expensive as a conventional chrome copper alloy.

Accordingly, it is seen that there is a need for a bimetal electrode having a dispersion strengthened copper tip and a shank portion formed of a less expensive, high conductivity copper which is sufficiently hard to withstand the stress of a resistance welding operation.

SUMMARY OF THE INVENTION

A bimetal resistance welding electrode has a tip formed of a dispersion strengthened, internally oxidized copper-aluminum alloy. A shank of a high conductivity copper is brazed to the tip and is extruded into a hollow, full hardened shank portion. The brazed connection between the tip and the shank is created prior to extruding the shank such that the shank ultimately is full hard, even if annealed by the brazing process.

The bimetal resistance welding electrode is formed by cutting a first rod of the desired quantity of dispersion strengthened copper material for the electrode tip and upsetting the first rod to form a first, solid cylindrical billet of extrusion diameter having a negative locator recess centrally positioned in one end thereof. A second rod of the desired quantity of high conductivity copper for the shank of the electrode is cut and upset to form a second, solid cylindrical billet of extrusion diameter which has a positive locator protrusion which is centrally positioned on one end thereof. The first and second cylindrical billets are placed together with brazing compound therebetween such that the protrusion and the recess mate. The first and second solid billets and the brazing compound are then heated and the billets are brazed together into a single extrusion blank. The extrusion blank is then back extruded such that the full hard bimetal electrode is formed.

Accordingly, it is an object of the present invention to provide a full hard, bimetal resistance welding electrode having a shank portion of inexpensive high conductivity copper and a tip portion of dispersion strengthened copper alloy; to provide a method for making such an electrode in which billets of the two component metals are brazed together and then extruded to form the electrode; and to provide such a method in which the shank portion is formed by back extrusion such that a central cavity for circulation of cooling fluid is formed in the electrode.

Other objects and advantages of the invention will be apparent from the following description, the accompanying drawings, and the appended claims.

DETAILED DESCRIPTION OF THE PREFERRED EMBODIMENTS

Figure 1:
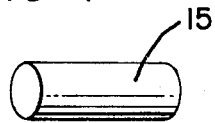
FIG. 1 shows a rod of high conductivity copper.
Figure 2:
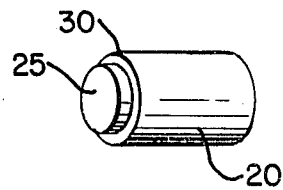
FIG. 2 shows the copper rod of FIG. 1 after upsetting to form a cylindrical billet.

Reference is now made to FIGS. 1-8 in which the various steps for forming the bimetal resistance welding electrode are illustrated. As shown in FIG. 1, a rod or wire 15 of high conductivity copper is cut producing a piece of appropriate volume for the shank portion of the electrode. Rod 15 is then upset to form the solid cylindrical billet 20 of predetermined diameter, as illustrated in FIG. 2. Cylindrical billet 20 has a positive locator protrusion 25 which is centrally positioned on end 30.

Figure 3:
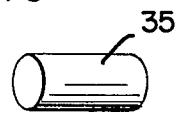
FIG. 3 shows a rod of dispersion strengthened copper material.
Figure 4:
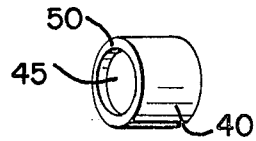
FIG. 4 shows a billet formed from the rod of FIG. 3.

A rod or wire 35 of the desired quantity of dispersion strengthened copper alloy material is cut, as shown in FIG. 3. The copper alloy may advantageously be of the type disclosed in U.S. Pat. No. 3,779,714, issued Dec. 18, 1973, to Nadkarni et al., and marketed by the Glidden-Durkee Division of SCM Corp., Baltimore, Maryland, 21226 as GLID COPPER. This alloy resists annealing at elevated temperatures and is an extremely good electrical conductor, as well as being very hard. These properties are accentuated by cold working of the alloy. The upsetting process by which the billet 40 of FIG. 4 is formed thus has the effect of working the metal to produce an extremely hard billet. Preferably, the cold working should be sufficient to increase the cross sectional area by at least 50%. Billet 40 is of the same diameter as billet 20 and has a negative locator recess 45 positioned centrally in end 50.

Figure 5:
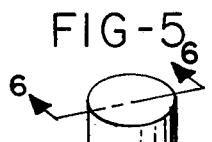
FIG. 5 shows a bimetal cylinder formed by brazing together the billets of FIG. 2 and 4.
Figure 6:
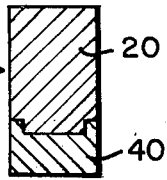
FIG. 6 is a sectional view taken generally along line 6—6 in FIG. 5.
Figure 7:
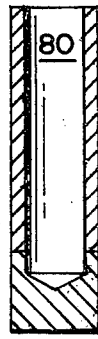
FIG. 7 is a view showing the cylinder of FIG. 6 after extrusion.
Figure 8:
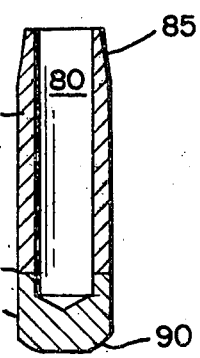
FIG. 8 shows the final electrode after machining.

As shown in FIGS. 5 and 6, billets 20 and 40 are placed together with a brazing compound therebetween such that the protrusion 25 and the recess 45 will mate. The billets are heated to approximately 1350° Farenheit and brazed to form extrusion blank 60. Since the dispersion strengthened copper resists annealing up to approximately 1700° F, the billet 40 remains full hard; the high conductivity copper in billet 20 will be annealed, however, as the brazing compound melts. Extrusion blank 60 is then back extruded to form the electrode of FIG. 7 having a full hard, hollow extruded shank 65 of high conductivity copper and a dispersion strengthened copper tip 70 with a brazed connection 75 between the two. A central cavity 80, defined by shank 65, may be supplied with a cooling liquid during the resistance welding process. As seen in FIG. 8, a locking taper portion 85 may be machined onto shank 65 by any one of a number of processes including grinding and cutting. The tip portion 70 may also have slight portions removed by machining, such as at 90, to produce the final desired tip shape.

Figure 9:
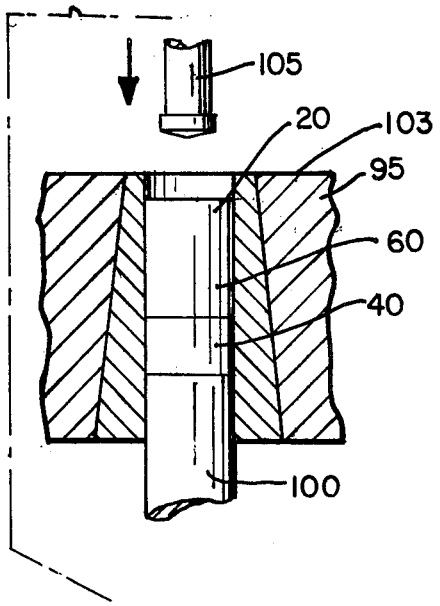
FIGS. 9 and 10 illustrate the back extrusion process by which the electrode is formed.
Figure 10:
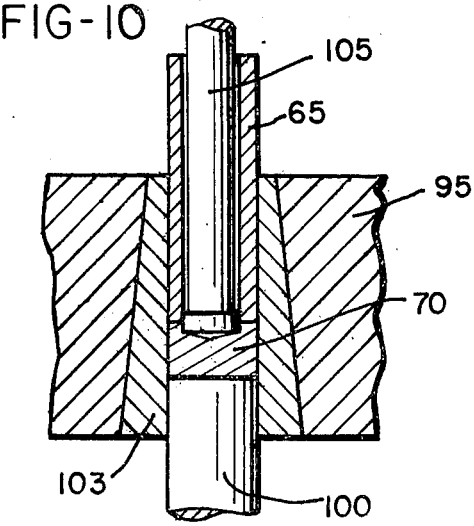

FIGS. 9 and 10 are illustrative of the back extrusion process by which the electrode of the present invention may be formed. The extrusion blank 60, comprising billets 20 and 40 which have been brazed together, is placed in an extrusion die 95. The blank 60 is supported by a knock-out pin 100 during the extrusion process. A carbide tapered insert 103 is provided to minimize wear. An extrusion punch 105 is pressed into die 95, causing the billet 20 of high conductivity copper to extrude upward above the die, as shown in FIG. 10. This extrusion process forms the cavity 80, and, at the same time, full hardens the shank portion 65 of the electrode. As will be noted in FIG. 10, the working of the dispersion strengthened copper tip portion 70 is not substantial during the extrusion process. Since, however, the tip portion was not softened by annealing during the brazing process, working of the tip porton is not needed to reharden it. It is important, however, that the brazed connection 75 be adjacent the cavity 80 in the final electrode such that all of the high conductivity copper will be cooled by the fluid in cavity 80. If all of the shank 65 of high conductivity copper were not cooled, the shank would anneal and soften.

While the process and product herein described constitute preferred embodiments of the invention, it is to be understood that the invention is not limited to this precise process and product, and that changes may be made therein without departing from the scope of the invention.

I claim:

1. A method of making a bimetal resistance welding electrode having a dispersion strengthened copper tip and a high conductivity copper shank, comprising:

(a) cutting a first rod of the desired quantity of dispersion strengthened copper material for the electrode tip, (b) upsetting said first rod to form a first solid cylindrical billet of extrusion diameter having a negative locator recess centrally positioned in one end thereof, (c) cutting a second rod of the desired quantity of high conductivity copper for the shank of the electrode, (d) upsetting said second rod to form a second solid cylindrical billet of extrusion diameter having a positive locator protrusion which is centrally positioned on one end thereof, (e) placing together said first and second solid cylindrical billets with brazing compound therebetween such that said protrusion and said recess mate, (f) heating said first and second solid billets and said brazing compound such that said billets are brazed together into a single extrusion blank having a first cylindrical portion formed of dispersion strengthened copper and a second cylindrical portion formed of annealed high conductivity copper, and (g) back extruding said second cylindrical portion of said extrusion blank such that a high conductivity shank is formed while only partially back extruding said first cylindrical portion of said extrusion blank, thereby forming a full hard bimetal electrode.

2. A method of making a bimetal resistive welding electrode having a tip portion formed of a dispersion strengthened copper and a shank portion formed of a high conductivity copper, comprising the steps of:

forming a first cylindrical billet of dispersion strengthened copper, forming a second cylindrical billet of high conductivity copper, brazing together said first and second cylindrical billets at a temperature which does not anneal said dispersion strengthened copper to form a bimetal cylinder having a first cylindrical portion formed of dispersion strengthened copper and a second cylindrical portion formed of annealed high conductivity copper, and then extruding said second cylindrical portion of said bimetal cylinder into a hardened shank portion while only partially extruding said first cylindrical portion of said bimetal cylinder thereby forming a full hard bimetal electrode.

3. The method of claim 2 comprising the further steps of forming a locking taper on the shank portion of the electrode and forming the tip portion of the electrode into a desired shape.

4. The method of claim 2 in which said step of extruding comprises the step of back extruding said second cylindrical portion of said bimetal cylinder such that a central cavity is formed in the electrode.

5. The method of claim 2 in which the step of forming a first cylindrical billet of dispersion strengthened copper includes the step of cold working a rod of dispersion strengthened copper such that its cross sectional area is increased at least 50%.

* * * * *